T. L. GOOD.
POTATO PLANTER.
APPLICATION FILED JULY 8, 1909.
955,395.
Patented Apr. 19, 1910.
2 SHEETS—SHEET 1.
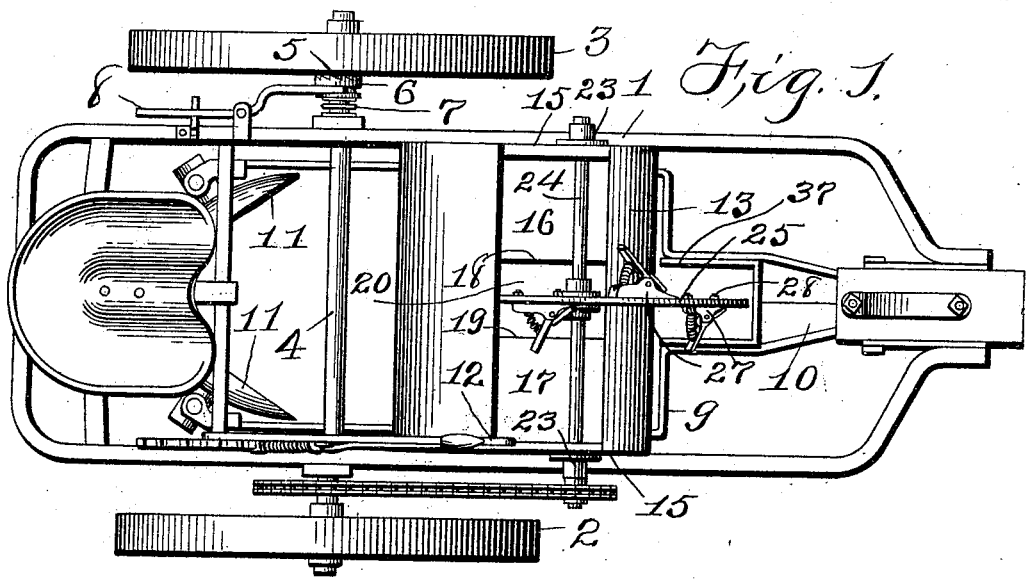
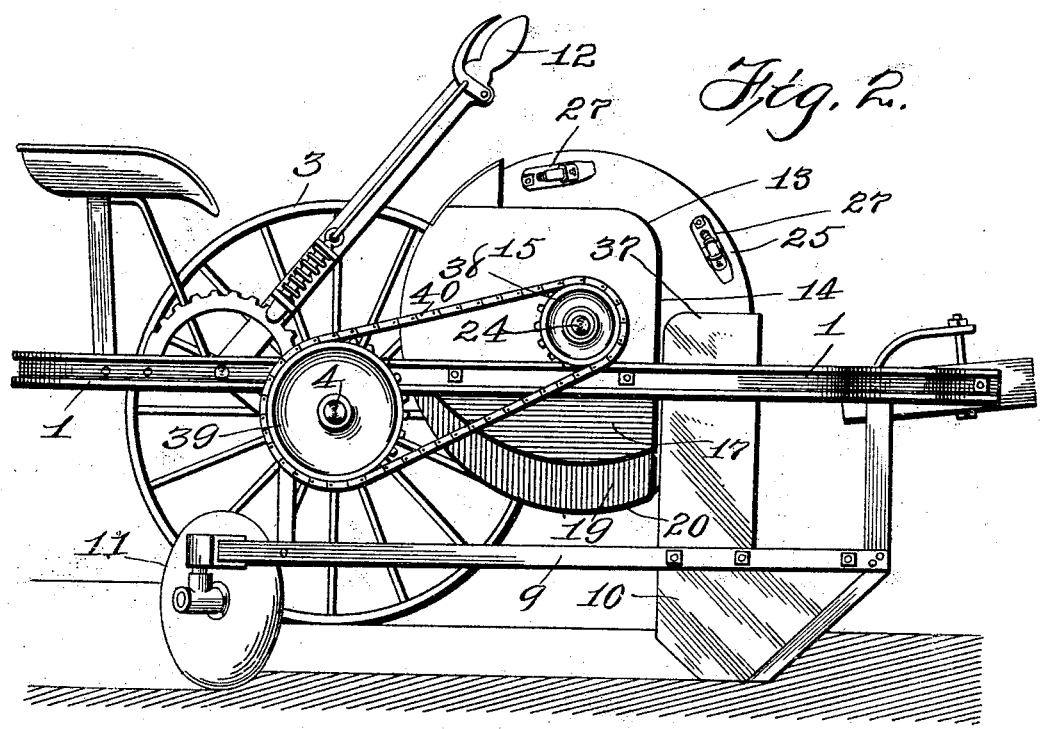
Attest:
H. G. Fletcher
E. L. Wallace
Inventor:
Thomas L. Good
by Higdon & Longan, Attys.

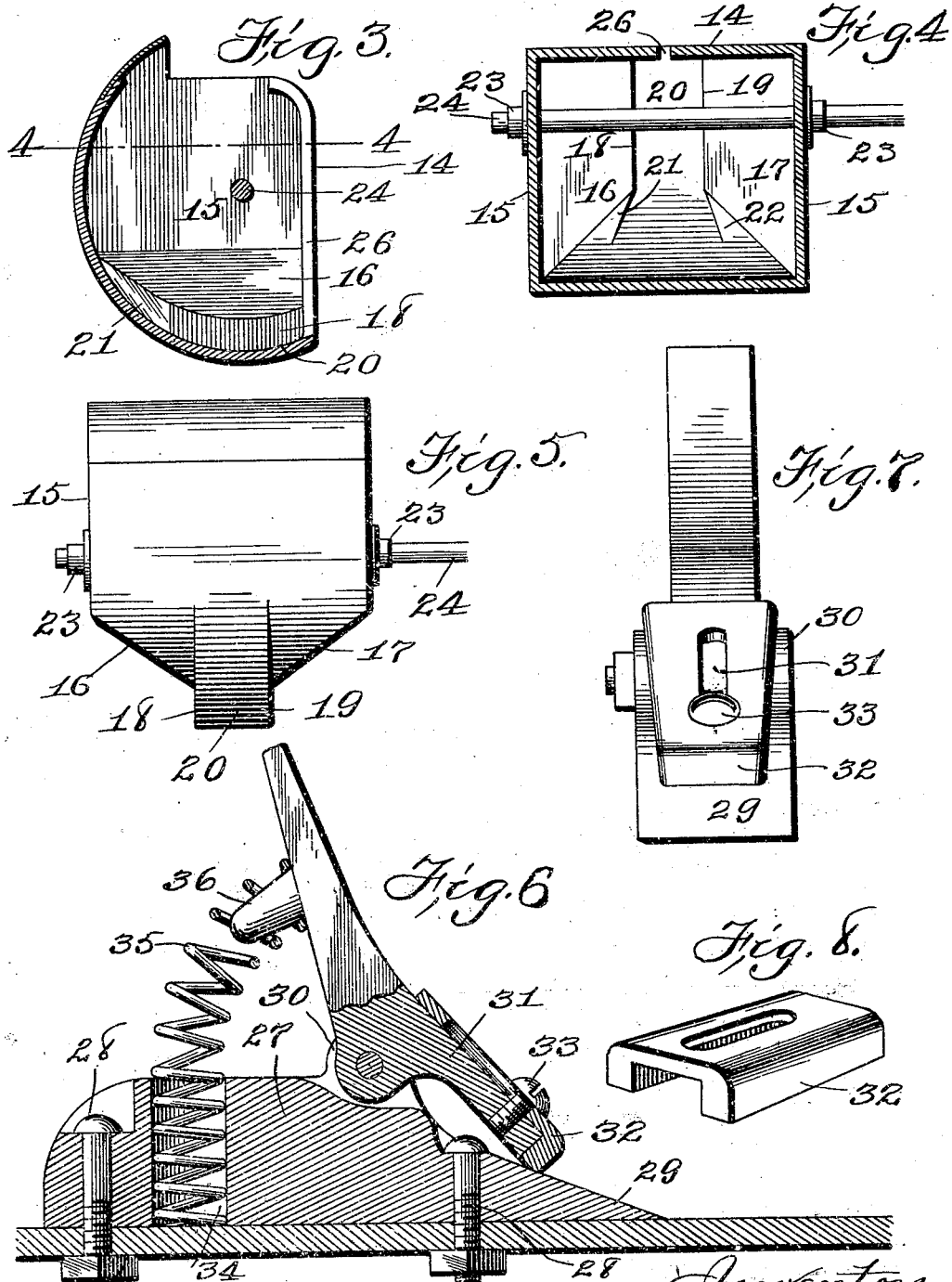

UNITED STATES PATENT OFFICE.

THOMAS LELAND GOOD, OF EDWARDSVILLE, ILLINOIS, ASSIGNOR OF ONE-FOURTH TO T. A. DESMOND, ONE-FOURTH TO HENRY BAIRD, AND ONE-FOURTH TO ROBERT J. BAIRD, ALL OF EDWARDSVILLE, ILLINOIS.

POTATO-PLANTER.

955,395.  Specification of Letters Patent.  Patented Apr. 19, 1910.

Application filed July 8, 1909. Serial No. 506,454.

*To all whom it may concern:*

Be it known that I, THOMAS LELAND GOOD, a citizen of the United States, and resident of Edwardsville, Illinois, have invented certain new and useful Improvements in Potato-Planters, of which the following is a specification containing a full, clear, and exact description, reference being had to the accompanying drawings, forming a part hereof.

My invention relates to improvements in potato planters, the object of my invention being to improve the construction of seed potato planters, whereby the cost of manufacturing such machines is reduced to a minimum and the means for selecting and dropping the potatoes is more accurate and efficient.

For the above purpose my invention consists in certain novel features of the construction and arrangement of parts as will be hereinafter more fully described, pointed out in my claims and illustrated in the accompanying drawings, in which:

Figure 1 is a plan of the complete planter; Fig. 2 is an elevation of the planter with the right hand supporting wheel removed; Fig. 3 is a central, vertical, sectional elevation of the hopper; Fig. 4 is a sectional plan of the hopper taken on line 4—4 of Fig. 3; Fig. 5 is a rear elevation of the hopper; Fig. 6 is a sectional elevation of one of the pickers and a section of the rotating disk; Fig. 7 is a front elevation of one of the pickers; and Fig. 8 is a detail perspective of the adjustable jaw for the pickers.

Referring by numerals to the accompanying drawings: 1 designates the frame of the planter and 2 and 3 the supporting wheels for the frame loosely mounted on the axle 4. The wheel 3 being provided with a clutch member 5 arranged to coact with a clutch 6 keyed or otherwise fixed to the axle. There being a spring 7 to normally hold the clutch members in contact with each other and a lever 8 to hold the member 6 out of engagement with the member 5 when desired. Carried by the planter frame is a frame 9 pivoted to the forward end of the frame 1 arranged to carry a furrow opener 10 and a pair of disks 11 for closing the furrow. This frame 9 is raised and lowered by means of a lever 12 to carry the furrow opener and disks either in operative or inoperative positions, and for adjustment relative to depth of furrow desired.

A hopper 13 is mounted in advance of the axle 4 and is provided with a vertical forward wall 14 and vertical side walls 15, the forward wall being curved inwardly and rearwardly near the top of the hopper to prevent potatoes from falling from the hopper when filled and in use over rough ground. The bottom walls 16 and 17 incline inwardly and downwardly toward each other from the side walls 15 and are provided with vertical walls 18 and 19, thence horizontally to the center of the hopper forming a trough 20. The rear ends 21 and 22 of the side walls of the trough 20 are flared outwardly. Bearings 23 are fixed to the side walls of the hopper 13 and a shaft 24 is mounted for rotation therein. A disk 25 is carried by the shaft 24 and arranged for rotation therewith, said disk dividing the hopper into separate compartments for the seed potatoes. The forward wall 14 is provided with a slot 26 through which the disk travels and the trough 20 and rear wall of the hopper are circular and described by an arc drawn from the center of the shaft 24.

Fixed to the disk 25, on either side face thereof, is a series of pickers 27; the body portions of said pickers being provided with openings through which bolts 28 are passed to secure the pickers to the disk. The forward end of each picker is tapered to form a jaw 29. Perforated ears 30 are formed integral with the body portion of the picker and a movable jaw 31 is pivoted in said ears, the forward end of the jaw 31 is provided with an adjustable slotted extension plate 32 secured to the jaw 31 by a set screw 33. A cavity 34 is formed in the body portion of the picker adjacent the rear end thereof and an extensile coil spring 35 is held therein, said spring 35 impinging the outer end of the movable jaw 31 and embracing a boss 36 to prevent its movement laterally relative to the jaw 31. A guide 37 is carried by the frame 9 and extends upwardly somewhat a considerable distance above the furrow opener 10. To impart motion to the shaft 24 and disk 35 a sprocket wheel 38 is fixed to the shaft 24 and a sprocket wheel 39 is fixed to the axle 4 and a chain 40 embraces the wheels 38 and 39 so that when the planter is advanced the shaft 24 and disk 25 are rotated.

In the operation of the machine, assuming the hopper to be filled with seed potatoes and the machine advanced with the clutches 5 and 6 in contact, it is obvious that the disk 25 will be rotated and as the pickers are advanced through the trough 20 the outer ends of the movable jaws will be engaged by the walls 18 and 19, thereby separating the jaws of the picker to grasp a potato. A further rotation of the disk and movement of the pickers in the trough will, by reason of the flaring ends of the walls 18 and 19, permit the spring of the picker to gradually close the jaws and secure a potato there between. The picker is then advanced carrying the potato until it reaches the guide 37 where, by reason of its contact with the guide 37, the jaws will be separated and the potato allowed to drop through the guide and to the rear of the furrow opener 10. A continued advancement of the picker will cause the successive pickers on either side of the disk 25 to grasp a potato and deliver it to the guide, the disks closing the furrow and covering the potatoes.

Heretofore the means for picking potatoes from the hopper had no provision of a vertical wall with a flaring end for a gradual closing of the picker jaws against a potato thereby crushing the potatoes when grasped but more often caused the potato to be shot from the jaws. By my improved construction of movable jaw potato sections of various sizes may be handled by releasing the set screw 33 and moving the plate 32 relative to the jaw.

Heretofore hoppers have been placed upon machine frames in such positions as to prohibit planting in extremely high hills or ridges. By my improved construction, of guides being carried altitudinally adjustable relative to the hopper, I may position my hopper much higher than in ordinary construction, thereby permitting the hopper to ride over hills and the guide directing the potatoes to fall in the furrow immediately after it is opened.

I claim:

1. In a potato planter, a hopper, a rotatable disk completely dividing the hopper into separate non-communicating compartments, pickers arranged on each face of the disk, means for operating the pickers to grasp potatoes within the hopper and means for operating the pickers to release the potatoes outside the hopper.

2. In a potato planter, a hopper, vertical walls having flaring rear ends arranged adjacent the bottom of the hopper, a disk rotatably mounted in and dividing said hopper into separate non-communicating compartments, pickers carried by each face of said disk arranged to engage said walls and means for opening said pickers to release the potatoes.

3. In a potato planter, a hopper, vertical walls having flaring ends arranged adjacent the bottom of said hopper, a disk rotatably mounted in and dividing said hopper into separate non-communicating compartments, pickers carried by each face of said disk arranged to engage said walls and an adjustable guide for opening said pickers to release the potatoes and direct them beneath a furrow opener.

4. In a potato planter, a hopper, vertical walls having flaring ends arranged adjacent the bottom of the hopper and formed integral therewith, a disk rotatably mounted in and dividing said hopper into separate, non-communicating compartments, pickers carried by said disk having a movable jaw spring actuated in one direction arranged to engage said walls, a furrow opener, a guide carried by said furrow opener arranged to engage the movable jaws of the pickers to release potatoes from the pickers and direct them to the rear of the furrow opener.

5. In a potato planter, a hopper, a disk rotatably mounted in said hopper dividing the hopper into non-communicating compartments, pickers having a fixed jaw and a movable jaw carried by said disk arranged to pick potatoes from their compartments, means for releasing the potatoes from said pickers, said movable jaw being provided with a member longitudinally adjustable relative to the jaw proper to receive potatoes of different sizes.

6. In a potato planter, a frame, wheels supporting said frame, a hopper carried by said frame, a disk rotatably mounted in said hopper and dividing it into non-communicating compartments, pickers arranged on either face of said disk, spring actuated jaws carried by said disk, longitudinally adjustable members carried by the spring actuated jaws, vertical walls having flaring ends formed integral with the bottom of said hopper to engage the spring actuated jaws of the pickers and means for releasing the potatoes from the pickers.

7. In a potato planter, a hopper, a trough having vertical sides with flaring ends, a shaft rotatably mounted in said hopper, a disk carried by said shaft dividing the hopper into non-communicating compartments, pickers having a fixed jaw and a movable jaw arranged on either face of said disk, longitudinally adjustable members carried by the movable jaws, means for opening the pickers to receive potatoes from the hopper and means for releasing the potatoes from said pickers.

8. In a potato planter, a frame, wheels supporting said frame, a second frame pivotally carried by the planter frame, a furrow opener carried by said second frame, disks for closing the furrow opener carried by said second frame, a guide fixed to said furrow opener, means for altitudinally adjusting the furrow opener, disks and guide, a hopper mounted on the planter frame, a disk rotatably mounted in said hopper dividing it into non-communicating compartments, pickers arranged on either face of said disk, means for opening said pickers to receive potatoes from the hopper and means for rotating said disk.

In testimony whereof, I have signed my name to this specification, in presence of two subscribing witnesses.

THOMAS LELAND GOOD.

Witnesses:
GEO. W. MAHLER,
C. L. DUEBLES.